June 20, 1944.  C. D. WOOD  2,351,795
METHOD OF TREATING COMPLEX LEAD-ZINC ORE
Filed Feb. 13, 1943
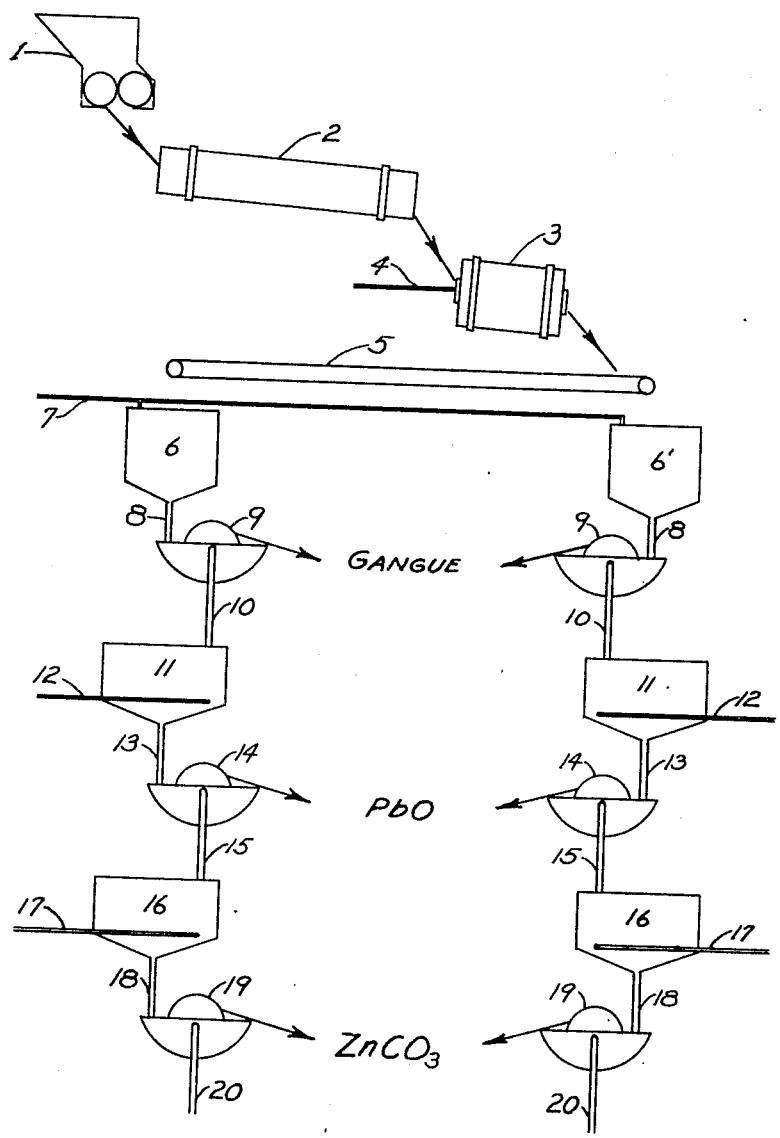
CHARLES D. WOOD
INVENTOR.
BY
ATTORNEY Patented June 20, 1944

2,351,795

UNITED STATES PATENT OFFICE 2,351,795

METHOD OF TREATING COMPLEX LEAD-ZINC ORES

Charles D. Wood, Huntington Park, Calif., assignor to Los Angeles Chemical Co., Los Angeles, Calif., a corporation of California Application February 13, 1943, Serial No. 475,722

3 Claims. (Cl. 75—120)

The present invention pertains to a method of treating ores containing lead and zinc, for the purpose of permitting ready separation of these two metals from the ore. Ores containing lead and zinc in admixture exist in very large quantities and although tremendous amounts of these metals are available in this form of ore, the ore has not been used because of the difficulty heretofore encountered in separating zinc from lead, and vice versa. Zinc contaminated with lead is not adapted for many of the uses to which zinc is put and lead contaminated with zinc is unsuited for many uses other than paint pigment. Even for the latter purpose the manufacturers of paint pigments desire a ratio of approximately five times as much zinc as lead in the mixture.

The lead and zinc ores contain these metals in the form of carbonates and sulfides. Separation of the metals from the ore is rendered difficult in many causes due to the fact that the slagging point of the ore is lower than the reduction point.

The present invention is directed to a simple and effective method of treating these complex ores so as to permit the ready separation of lead from the zinc and at the same time from whatever iron is customarily present in such ores.

Generally stated, the invention contemplates roasting the ore to convert the lead and zinc compounds into oxide and then subjecting the finely ground roasted ore to the action of an aqueous medium containing caustic soda so as to form soluble lead and zinc compounds. The gangue or insoluble compounds are then removed by filtration, sedimentation or the like and the soluble lead compounds oxidized and precipitated from the solution. After removal of the oxidized lead compounds, the remaining solution is treated for the precipitation and removal of zinc therefrom.

An object of the present invention, therefore, is to disclose and provide a method of treating ores containing lead and zinc for the recovery of these metals therefrom.

A further object of the invention is to disclose and provide a relatively simple and effective method of removing lead and zinc as separate metal compounds or metals from ores containing these metals in admixture.

A still further object of the invention is to disclose and provide a mode of treating lead and zinc ores whereby soluble metal compounds are formed and the lead then precipitated therefrom.

Again, an object of the present invention is to disclose a process capable of utilizing the excessive quantities of caustic soda made available as a by-product of the magnesium metal industry, in the treatment of lead-zinc ores.

These and other objects, adaptations, advantages and uses of the present invention will become apparent to those skilled in the art from the following description of the process. In order to facilitate understanding, reference will be had to the appended graph which diagrammatically illustrates exemplary forms of devices which may be used and the steps of the process.

As previously stated, lead-zinc ores generally contain zinc and lead either as a carbonate or sulfide. The gangue with which these metal compounds are associated may vary extensively in composition, although in many instances these lead-zinc ores are found in dolomitic formations so that calcium and magnesium occur in relatively large amounts. The ores may also contain appreciable quantities of iron, many of them containing from about 6% to as high as 10% or 12% of iron.

The present invention is particularly well adapted for use in localities where large quantities of caustic soda are available. Since the process does not require concentrated caustic soda solutions, the liquor from electrolytic chlorine cells, generally containing about 8% to 10% of sodium hydroxide and 10% to 12% sodium chloride, may be used.

The following description exemplifies the steps which may be carried out in accordance with the invention.

The lead-zinc ore may be crushed in any suitable crusher 1 to a size adapted for roasting. The size or mesh of the ore may be varied, depending upon the type of roasting equipment employed. Ordinarily, crushing the ore so as to pass a 1 inch mesh is sufficient. The ore is then roasted in any suitable equipment, such as for example, the rotary kiln 2, for the purpose of reducing the ore, and particularly the zinc and lead compounds therein, to the form of oxides. Galena, PbS, is oxidized in this manner to PbO; the zinc and lead carbonates are also oxidized to PbO and ZnO. Obviously other reactions may simultaneously take place but since they do not materially affect the ultimate result, they will not be described in detail.

The roasted ore is then preferably ground to a state of fine division and brought into contact with an aqueous medium containing caustic soda. Although the ore may be first ground to a state of fine division, say to pass a 16 or 20 mesh sieve, and then brought into contact with the caustic soda solution, the appended flow chart shows this fine grinding as taking place in a ball or tube mill 3, which is supplied with the roasted ore and with a relatively small quantity of caustic soda solution through a line 4. Wet grinding is thus accomplished in the ball or tube mill 3 and a more intimate and rapid reaction is thus attained.

The ground roasted ore may then be distributed as by means of a conveyor 5 into suitable boiling or leaching tanks 6, 6', etc. Additional quantities of solution containing sodium hydroxide may be supplied to these tanks as by line 7. Each of the tanks may be provided with heating means, such as for example, suitable coils supplied with steam. The reaction between the caustic soda and the ore is facilitated by the use of high temperatures, that is, temperatures on the order of 180° F. to about 220° F., but it is to be understood that the invention is not limited to the use of superatmospheric temperatures since lower temperatures may be employed. The use of lower temperatures, such as atmospheric temperatures, requires greater time of contact between the solution and the ore, but the same reactions will take place.

In the event caustic solutions from electrolytic cells are available, said solutions may be supplied to the tanks 6 through the line 7 in quantity sufficient to form soluble lead and zinc compounds. Relatively dilute solutions of sodium hydroxide may be employed and the presence of sodium chloride in the solutions is not detrimental since the sodium chloride remains as an inert ingredient. Solutions ranging from 6% to about 12% sodium hydroxide may be employed although more concentrated solutions will react more rapidly. For commercial operation it is not necessary to use concentrations in excess of about 20% sodium hydroxide.

The reactions which take place in the tanks 6 may be represented as follows:

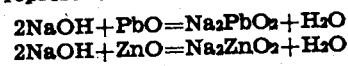

In other words, the lead and zinc oxides are converted by the caustic soda solution to sodium plumbite and sodium zincate. The amount of sodium hydroxide supplied to the tanks should not be materially in excess of the amount required to convert the lead and zinc into the soluble sodium compounds thereof. However, it has been found that some forms of sodium silicate are also formed in small amounts.

After the reaction has been completed, the contents of the tanks may be passed by suitable conduits, such as 8, to means for separating solids from liquids. Although sedimentation tanks may be used, continuous type filters have been found satisfactory. The appended diagram illustrates the continuous filters 9 and 9' adapted to discharge the unreacted solids or gangue to a suitable point of disposal, the solutions being then sent as by conduits 10 to suitable tanks 11 for the precipitation of lead from the solution.

The separation of lead from the solution (which contains the sodium salts of lead and zinc) can be most readily effected by passing chlorine through the solution. For example, the tank 11 may be provided with suitably perforated distribution coils supplied with chlorine by line 12. The sodium plumbite is decomposed by the chlorine into sodium chloride and lead oxide. The chlorination should be carried out with chlorine sufficient to decompose the sodium plumbite but insufficient to form zinc chloride. Zinc chloride will not form, however, until substantially all of the lead compound has been oxidized into lead oxide. The temperature during the chlorinating step may range from atmospheric to temperatures of the order of 135° F. The use to which the resulting lead oxide is put may influence the temperature at which the chlorination is carried out since yellow lead oxides are formed at lower temperatures and the darker or redder lead oxides are formed at higher temperatures. The precipitated lead is not as colloidal in particle size when higher temperatures are employed during calcination.

After the lead has been precipitated in the form of oxides as described hereinabove, the suspension may be discharged as by line 13 into a continuous filter 14 and the precipitated lead oxides filtered off. The remaining solution containing sodium zincate is discharged from the filter 14 by line 15 and sent to tank 16. This tank is used in precipitating zinc in the form of a carbonate, which is most readily formed by bubbling carbon dioxide gas through the solution in tank 16, carbon dioxide being supplied by line 17 to a suitable spray head, perforated distribution pipe, or the like. The reaction taking place in tank 16 may be represented as follows:

Upon precipitation of the zinc carbonate in the manner described, the solution may be discharged from tank 16 by line 18 to filters 19, the zinc carbonate being separated from the residual liquid. This residual liquid discharged by line 20 may be used in cyclic operation of the process or for other purposes.

It is to be noted that the carbon dioxide used in carbonation may consist in large part of stack gases derived from the roasting operation. It is also to be noted that although the slurry is preferably heated in the digestion tanks 6, the solution of the soluble zinc and lead compounds should be at a lower temperature during oxidation of the lead compounds into lead oxides. Cooling, although not illustrated in the appended diagram, may take place either by the use of suitable storage tanks and lapse of time or by the use of spray ponds. During the oxidizing reaction which takes place in tanks 11, an excess of caustic should be present. The reaction which takes place when chlorine is used is not well understood and it may well be that the chlorine forms sodium hypochlorite which in turn causes the decomposition of the sodium plumbite.

The products obtained, namely, oxides of lead and zinc carbonate, are of sufficiently high purity to be readily adapted for use as sources for the pure metals lead and zinc, or for the many other uses to which these metallic compounds are suited. The zinc carbonate may be used as such for some purposes or it may be roasted to form zinc oxide. In addition, attention is called to the fact that the gangue obtained in the first separating setp is also of commercial importance. Most lead-zinc ores contain silver and other metals and although the original ore may contain silver in such small quantities that the recovery of silver therefrom is not commercially economical, the gangue obtained by the treatment of the present invention contains the silver in a concentrated form. The gangue may therefore be considered to be a concentrate which can be economically treated for the recovery of silver and other metals therefrom.

It is to be understood that numerous changes and modifications may be made. The steps of washing the precipitated products during filtration or subsequent to such filtration have not been specifically referred to but all changes and modifications coming within the scope of the appended claims are embraced thereby.

I claim:

1. A method of treating ores containing lead and zinc in the form of carbonates and sulfides, comprising: roasting the ore to convert lead and zinc therein into oxides; subjecting the roasted ore to the action of an aqueous medium containing caustic soda, to form soluble lead and zinc compounds; separating insoluble gangue from the resulting solution; passing chlorine gas through the solution in amount sufficient to precipitate an oxide of lead therefrom; removing the precipitated lead oxide from the solution; and then carbonating the solution to form zinc carbonate and removing the zinc carbonate from the residual solution.

2. A method of treating ores containing both lead and zinc in the form of carbonates and sulfides, which comprises: roasting the ore to convert lead and zinc therein into oxides; grinding the roasted ore to a state of fine division in the presence of an aqueous solution containing caustic soda; subjecting the ground roasted ore to the action of additional aqueous medium containing caustic soda to form sodium plumbite and sodium zincate; removing insoluble matter from the solution; passing chlorine through the solution in quantity sufficient to convert sodium plumbite into lead oxide; separating the precipitated lead oxide from the solution; then carbonating the remaining solution to form zinc carbonate and separating the zinc carbonate from the residual solution.

3. In a method of treating alkaline aqueous solutions containing sodium plumbite and sodium zincate obtained by digesting lead-zinc ores with sodium hydroxide solutions, the steps of: removing insoluble matter from the solution; passing chlorine through the solution in quantity sufficient to convert sodium plumbite into lead oxide; separating the precipitated lead oxide from the solution; then carbonating the remaining solution to form zinc carbonate; and separating the zinc carbonate from the residual solution.

CHARLES D. WOOD.